United States Patent [19]
Renz et al.

[11] 4,299,425
[45] Nov. 10, 1981

[54] CENTRAL LOCKING MECHANISM FOR WEB DISK WHEELS

[75] Inventors: Dieter Renz, Rechberghausen; Hermann Schobbe, Fellbach; Bernd Löper, Korb, all of Fed. Rep. of Germany

[73] Assignee: Daimler-Benz Aktiengesellschaft, Stuttgart, Fed. Rep. of Germany

[21] Appl. No.: 33,841

[22] Filed: Apr. 27, 1979

[30] Foreign Application Priority Data

Apr. 27, 1978 [DE] Fed. Rep. of Germany ....... 2818512

[51] Int. Cl.³ .................................. B60B 3/14
[52] U.S. Cl. .................. 301/9 CN; 301/9 SC; 301/114
[58] Field of Search ........... 301/1, 111, 112, 114–117, 301/126, 131–133, 9 CN, 9 SC, 9 AC; 403/259, 21, 359; 151/38; 85/32 K

[56] References Cited

U.S. PATENT DOCUMENTS

| | | | |
|---|---|---|---|
| 342,630 | 5/1886 | Partridge | 301/114 |
| 1,737,332 | 11/1929 | Pugh et al. | 301/9 SC X |
| 2,907,418 | 10/1959 | Hudson et al. | 403/21 |
| 3,053,357 | 9/1962 | Stanger | 403/21 |

FOREIGN PATENT DOCUMENTS

| | | | |
|---|---|---|---|
| 456992 | 9/1913 | France . | |
| 474,254 | 2/1915 | France | 301/9 SC |
| 535865 | 4/1922 | France | 301/9 CN |
| 246498 | 3/1926 | Italy | 301/9 AC |
| 411445 | 6/1934 | United Kingdom | 301/9 SC |
| 470655 | 8/1937 | United Kingdom | 301/9 CN |

*Primary Examiner*—Charles A. Marmor
*Attorney, Agent, or Firm*—Craig and Antonelli

[57] ABSTRACT

A central locking mechanism for web disk wheels having a central guide bushing which is provided with a central receiving bore for accommodating a wheel carrier pin with radial centering of the web disk wheel with respect to the wheel carrier pin and with a central threaded connection between the web disk wheel and the wheel carrier pin by way of a nut which is adapted to be screwed onto the wheel carrier pin. The nut is guided rotatably and axially displaceable with respect to the guide bushing and is captively joined thereto.

1 Claim, 1 Drawing Figure

U.S. Patent   Nov. 10, 1981   4,299,425
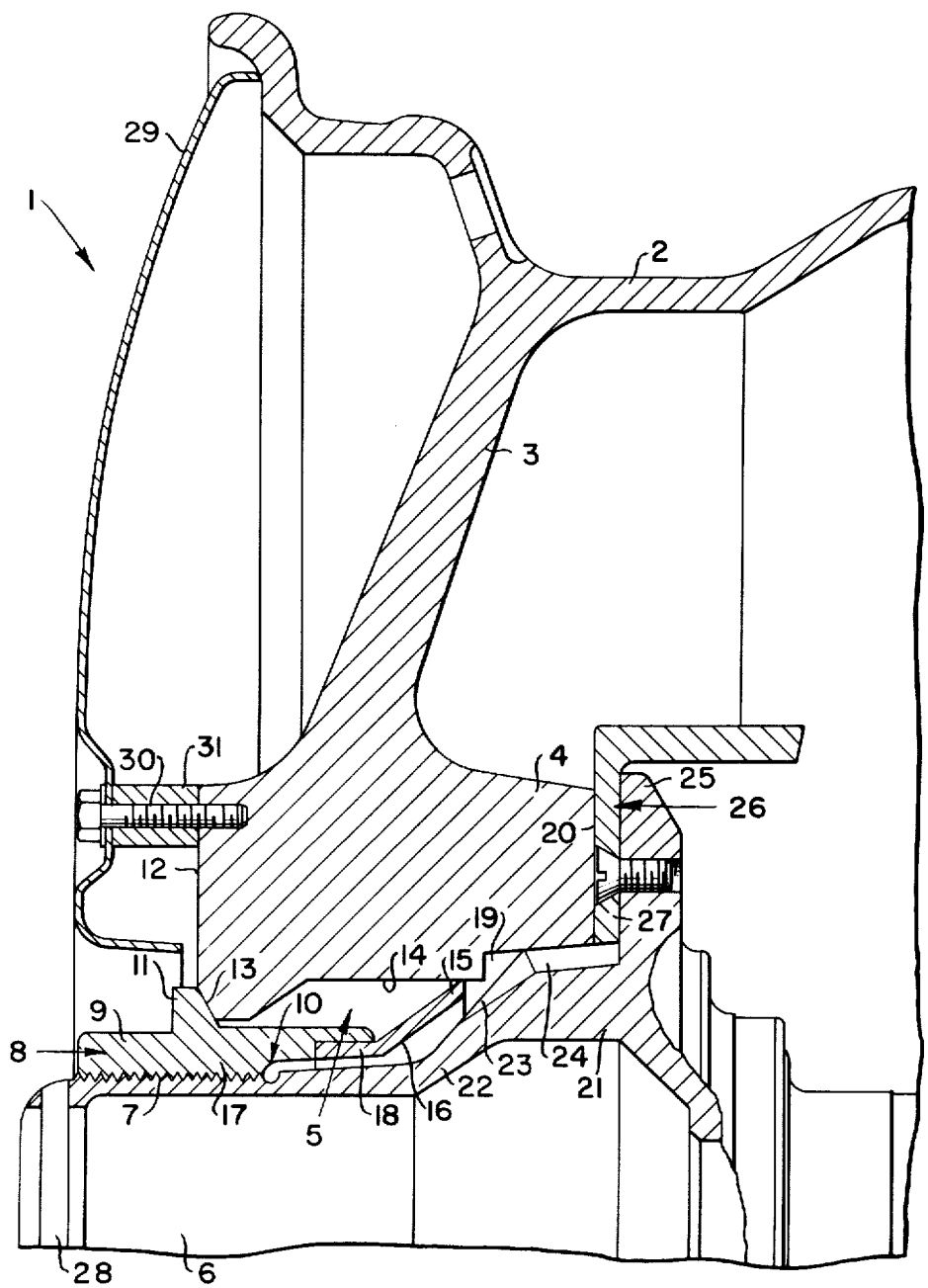

CENTRAL LOCKING MECHANISM FOR WEB DISK WHEELS

The present invention relates to a locking arrangement and, more particularly, to a central locking mechanism for a web disk wheel which includes a central guide bushing having a central receiving bore for accommodating a wheel carrier pin with a radial centering of the web disk wheel with respect to a wheel carrier pin and with a central threaded connection between the web disk wheel and the wheel carrier pin by a nut which is adapted to be threadably screwed onto the wheel carrier pin.

The aim underlying the present invention essentially resides in providing a central locking mechanism for web disk wheels which enables an especially rapid mounting of the wheel by a simple manipulation while, at the same time, not impairing a desired clearance-free fixation and centering of the wheel.

In accordance with advantageous features of the present invention, the nut is rotatably guided and is axially displaceable with respect to the guide bushing and is captively connected with the guide bushing. By virtue of such an arrangement, it is insured that, when the wheel is pulled off or removed from the wheel carrier pin, the nut remains joined to the wheel and, consequently, during subsequent mounting, in conjunction with placing the web disk wheel on the wheel carrier pin, the nut is simultaneously placed in a proper relative position with respect to the wheel carrier pin suitable for effecting the threaded connection. Moreover, a misplacing of the nut and/or a loss thereof is prevented so that all prerequisites are provided to insure a rapid and safe mounting operation of the wheel.

In accordance with further features of the present invention, a construction of a central locking mechanism in conjunction with a nonrotatable fixation and centering of the web disk wheel with respect to a wheel carrier pin is expedient wherein the guide bushing of the web disk wheel is fixed by means of serrations having especially a sinusoidal wave profile. Preferably, the serrations are located suitably in a zone of the wheel carrier pin remote from the carrier thread for the nut, that is, in an inner zone of the carrier pin. To obtain an especially easy assembly or mounting of the wheel, the serrations may be provided with a slight conicity.

In accordance with still additional advantageous features of the present invention, the serrations are provided with an end zone lying preferably in a more strongly inclined conical transition section of the wheel carrier pin to attain, during an attachment or mounting of the web disk wheel, a self-acting automatic alignment of the meshing teeth.

By virtue of the provision of serrations in a sinusoidal waveform, hereinafter referred to as sinusoidal serrations, especially satisfactory prerequisites for a clearance-free fixation as well as for a very rapid assembly are obtained.

In accordance with the present invention, the nut is provided with a guide collar axially engaging in the guide bushing with the guide collar extending behind the guide bushing in a radially broadened zone of the central receiving bore of the guide bushing.

The guide collar, in accordance with the present invention, may be fashioned so as to be by-partite and include an axially extending section integrally formed with a head portion of the nut as well as an adjoining radially oriented section or extension. Furthermore, the radially oriented section may extend toward a side facing away from the head portion.

To ensure a connection by simple means, the radially oriented section or extension may be fixed by a slip joint with respect to a section associated with a head portion of the nut.

The guide bushing may be fixed in position with respect to the wheel carrier pin in a shape-mating and nonrotatable fashion by way of serrations having a sinusoidal wave profile. The serration may, in accordance with the present invention flare conically in a mounting direction of the wheel.

In accordance with still further advantageous features of the present invention, by way of a serration profile provided for the nonrotatable fixation of the web disk wheel with respect to the wheel carrier pin, a brake disk can simultaneously be fixed in position in a shape-mating and nonrotatable fashion.

Furthermore, the wheel carrier pin may, in accordance with the present invention, be offset radially inwardly following an associated serration with a transition zone, constituting an engagement zone, being provided with teeth or serrations cooperable with teeth or serrations of the guide bushing.

Accordingly, it is an object of the present invention to provide a central locking mechanism for a web disk wheel which avoids, by simple means, shortcomings and disadvantages encountered in the prior art.

Another object of the present invention resides in providing a central locking mechanism for a web disk wheel which ensures a rapid and safe mounting and removal of the web disk wheel from a wheel carrier.

A further object of the present invention resides in providing a central locking mechanism for a web disk wheel by which it is possible to obtain a self acting and automatic alignment of the wheel with respect to the carrier during a mounting or attachment of the wheel to the carrier.

Another object of the present invention resides in providing a central locking mechanism for a web disk wheel which ensures a jam-free centering of the wheel relative to the wheel carrier.

A still further object of the present invention resides in providing a locking mechanism for a web disk wheel which is simple in construction and therefore relatively inexpensive to manufacture.

These and other objects, features, and advantages of the present invention will become more apparent from the following description when taken in connection with the accompanying drawing which shows, for the purpose of illustration only, one embodiment in accordance with the present invention, and wherein:

The single FIGURE is an axial cross-sectional view through a central locking mechanism for web disk wheels in accordance with the present invention.

Referring now to the drawing, a central threaded coupling, especially for wheels of a passenger motor vehicle includes a web disk wheel generally designated by the reference numeral 1 having a rim 2 connected with a central guide bushing 4 by way of a wheel web 3. The central guide bushing 4 is centrally provided with a receiving or locating bore 5 for accommodating a wheel carrier pin 6 which may be associated with, for example, a drive shaft of a motor vehicle (not shown) in a conventional manner. However, the wheel carrier pin 6 may also be formed by a part affixed to a wheel carrier.

The wheel carrier pin penetrates or extends into the guide bushing 4 and is provided at its outer free end with a threaded portion 7 which is adapted to threadably receive a nut generally designated by the reference numeral 8. As shown in the drawing, the guide bushing 4 is braced with respect to the wheel carrier pin by way of the nut 8. The nut 8 includes a radial shoulder 11 disposed between a head portion 9 and a guide collar generally designated by reference numeral 10 with the radial shoulder 11 supporting the nut 8 against the guide bushing 4. A contact surface is formed between the radial shoulder 11 and the central guide bushing 4 by a beveled annular zone 13 which is located in a transition region between the receiving or locating bore 5 and a wheel end face or panel 12 so that, in addition to an axial bracing action, an exact centering action as well as an axial bracing action are obtained by a cooperation of the conical annular zone 13 with a correspondingly conical boundary surface of the radial shoulder 11. In the illustrated position of the elements with the web disk wheel 1 fixed on the wheel carrier pin 6, the guide collar 10 of the nut 8 extends at least over a certain length into the guide bushing 4 corresponding to an axial displacement path of the nut 8 with respect to the wheel carrier pin 6 during a threaded engagement. Additionally, by way of a radially projecting extension 15, the guide collar 10 extends behind the guide bushing 4 in a region of a radial flaring portion 14 of the receiving or locating bore 5.

The radially projecting extension 15 is formed by a radially flaring section of a sleeve 16 which flaring section is disposed at a position remote from the head portion 9 of the nut 8. The sleeve 16 is provided in an extension line of an axially oriented section 17 of the guide collar 10 with the section 17 being integrally formed with the nut 8. In the illustrated embodiment, the section 17 is offset axially toward and outside in a direction of its free end with respect to a threaded portion of the nut 8 and carries the sleeve 16 in a region of its free end.

In the illustrated embodiment, the connection is effected by a slip joint and, for this purpose, the section 17 is radially stepped from the inside at its free end with the sleeve 16 overlapping in a zone of the stepped offset portion with an axial section 18 of the section 17 of the collar 10. This arrangement is advantageous in that, on the one hand, due to a funnel-like flaring of the radially projecting extension 15, an automatic alignment of the web disk wheel 1 is ensured with respect to the wheel carrier pin 6 as is essential particularly with a view toward avoiding damage to the thread. On the other hand, a simple and compact connection results between the web disk wheel 1 and the nut 8 by means of which the nut 8, according to the present invention, is always approximately axially aligned and guided with respect to the web disk wheel 1 since a support for the nut 8, with respect to the guide bushing 4, is ensured over a relatively large supporting base. Support is effected by way of a free rim of the projecting extension 15, the outer diameter of which corresponds approximately to an inner diameter of the radial flaring portion or zone 14 of the receiving or locating bore 5.

Additionally, the guide collar 10 is supported radially with respect to the receiving or locating bore 5 in a forward zone thereby adjacent to the annular zone 13. In the forward zone, the bore diameter corresponds approximately to an outer diameter of the guide collar 10 in the region of the section 17. Moreover, the connection between the sleeve 16 and the nut 8 proper, in a zone of the guide collar 10, may be established by simple means and, with an appropriate selection of the material can be considered absolutely safe even in cases where the connection is merely constituted by a slip joint. A part of the guide collar 10 connected by a slip joint remains without significance for the safety of the wheel mounting with respect to the wheel carrier.

On a side facing away from the wheel panel 12, the receiving or locating bore 5 of the guide sleeve 4 terminates in the illustrated embodiment, with a diameter approximately corresponding to a diameter of the radial flaring portion 14 wherein an end zone is provided with internal teeth preferably formed, in accordance with the present invention, as sinusoidal serrations, that is, serrations wherein the teeth thereof have a contour of sinusoidal waves. At a position opposite the wheel panel 12, the guide bushing 4 is provided with an axial contact surface or end face 20.

The serration 19 of the guide bushing 4 corresponds to a serrated or toothed section 24 provided on a radially thick end zone 21 of the wheel carrier pin 6. The serration 24 is continued into a conical transition zone 22 of the wheel carrier pin 6 lying in a forward direction, as viewed from a mounting direction of the wheel 1, and terminates in the transition zone. When the wheel web 3 is pushed onto the wheel carrier pin 6 the serration 19 of the guide bushing 4 initially contacts a part 23 of the serration 24 of the wheel carrier pin 6 lying in the transition zone 22. In addition to a centering action, due to the conically flaring configuration of the transition zone or section 22, there simultaneously occurs an alignment of the web disk wheel 1 in its angular position with respect to an axis of rotation of the wheel 1. This is due to the part 23 of the serration 24 lying in a zone of the transition region 22, this part 23 becoming deeper as viewed in a mounting direction of the wheel 1 and subsequently passing over into the serrated portion 24. The serrated portion 24 is continued to a wheel carrier flange 25 with a brake disk generally designated by the reference numeral 26 being fixed in position with respect to the flange 25.

In the illustrated embodiment, the brake disk 26 is provided with a collar 27 in contact with the wheel carrier flange 25 and radially inwardly with a serration corresponding to the serration 19 so that the brake disk 26 is fixed in place with respect to a wheel carrier pin 6 by way of the same serration 24 which serves for the fixation of the web disk wheel 1.

The sinusoidal serration provided in accordance with the present invention proves to be especially advantageous since it ensures a jam-free centering due to its wave-like configuration during a mounting of the web disk wheel 1 and furthermore ensures an especially flush seating of the wheel 1. This result is obtained particularly also in conjunction with the feature that the serrations 19 and 24 preferably lie on a cone which slightly flares in a mounting direction of the wheel 1.

No additional securing of the wheel 1 is ordinarily required for the threadedly connected nut 8; however, if additional safety measures are desirable, a transverse board 28 penetrating the wheel carrier 6 may be arranged for accommodating a cotter pin or the like.

In order to reduce air resistance to a minimum, the web disk wheel 1 may be provided with a shield, cover, or molding 29 for covering a zone of the wheel disk 1. The shield 1 terminates radially on an outside thereof in a zone of a horn of the rim 2. Mounting of the shield 29 may be accomplished by way of, for example, a threaded connection 30 by means of which the shield 29 is attached to the guide bushing 4 by way of an interposed spacer sleeve 31.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. In a central locking assembly for web disk wheels of the type wherein the wheel has a central guide bushing with a central bore for receiving a wheel carrier pin, means internally of said bore for radially centering the wheel with respect to the carrier pin, and a nut threadably engageable on said carrier pin and captively retained by a radially inwardly extending flange of said guide bushing, the improvement comprising: said nut being provided with a radial centering and bracing shoulder that is engageable with a corresponding annular zone on one side of said radially extending flange, a guide collar on said nut extending into said guide bushing and being provided with a funnel-like radially flaring section that is engageable with an opposite side of said radially extending flange, said guide collar having a length extending into said guide bushing corresponding to an axial displacement path of said nut with respect to said wheel carrier pin during threaded engagement, said flaring section reaching said opposite side of said annular flange when said nut is at a position corresponding to a disengagement end of said threaded engagement axial displacement path, and wherein said funnel-like section has a free rim of an outer diameter which corresponds approximately to an inner diameter of said guide bushing so as to provide a relatively large supporting base always approximately axially aligning and guiding said nut relative to the wheel.

* * * * *